(12) United States Patent
Dittrich et al.

(10) Patent No.: US 7,064,859 B1
(45) Date of Patent: Jun. 20, 2006

(54) METHOD, SYSTEM, PROGRAM, AND DATA STRUCTURE FOR PRODUCING A LOOK-UP TABLE TO ENHANCE PRINT QUALITY

(75) Inventors: Danielle Kathyrn Dittrich, Longmont, CO (US); Larry M. Ernst, Longmont, CO (US); Richard S. Lucky, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,857

(22) Filed: Mar. 27, 2000

(51) Int. Cl.
*G06K 15/00* (2006.01)

(52) U.S. Cl. ............... 358/1.9; 358/3.04; 358/3.09; 358/3.23

(58) Field of Classification Search ............ 358/1.9, 358/2.1, 2.99, 3.01, 3.02, 3.04, 3.09, 3.18, 358/3.23, 3.3, 3.1, 3.27, 1.15, 1.16
See application file for complete search history.

(56) References Cited

U.S. PATENT DOCUMENTS

| | | | | |
|---|---|---|---|---|
| 4,280,144 A | * | 7/1981 | Bacon | 358/280 |
| 4,681,424 A | | 7/1987 | Kantor et al. | 355/14 R |
| 4,700,199 A | | 10/1987 | Horlander | 346/26 |
| 4,701,836 A | | 10/1987 | Horlander | 346/26 |
| 5,128,698 A | | 7/1992 | Crawford et al. | 346/160 |
| 5,355,200 A | | 10/1994 | Ohba et al. | 355/246 |
| 5,359,423 A | | 10/1994 | Loce | 358/296 |
| 5,387,985 A | | 2/1995 | Loce et al. | 358/447 |
| 5,390,004 A | | 2/1995 | Hopkins | 355/208 |
| 5,480,240 A | | 1/1996 | Bolash et al. | 400/124.01 |
| 5,546,170 A | | 8/1996 | Ohba et al. | 355/246 |
| 5,583,621 A | | 12/1996 | Narukawa | 355/246 |
| 5,646,670 A | * | 7/1997 | Seto | 347/131 |
| 5,661,564 A | | 8/1997 | Tomida et al. | 358/296 |
| 5,668,635 A | | 9/1997 | Tomida et al. | 358/296 |
| 5,684,933 A | | 11/1997 | Nagafusa | 395/109 |
| 5,696,845 A | | 12/1997 | Loce et al. | 382/254 |
| 5,699,172 A | | 12/1997 | Hattori et al. | 358/459 |
| 5,721,793 A | * | 2/1998 | Ushida et al. | 382/300 |
| 5,724,455 A | | 3/1998 | Eschbach | 382/260 |
| 5,751,433 A | | 5/1998 | Narendranath et al. | 358/298 |
| 5,751,470 A | | 5/1998 | Damon | 358/298 |
| 5,764,664 A | * | 6/1998 | Yip et al. | 372/26 |
| 5,835,233 A | | 11/1998 | Otsu et al. | 358/298 |
| 5,876,132 A | | 3/1999 | Zable | 400/306 |
| 5,963,244 A | | 10/1999 | Mestha et al. | 347/251 |

FOREIGN PATENT DOCUMENTS

| | | |
|---|---|---|
| EP | 0858205 | 8/1998 |
| JP | 7266615 | 10/1995 |
| JP | 9277500 | 10/1997 |
| JP | 10166660 | 6/1998 |
| JP | 11055519 | 2/1999 |

OTHER PUBLICATIONS

U.S. Appl. No. 09/099,113, entitled "A System, Method, and Program For Saving Toner/Ink in a Color Printer Without Sacrificing Image Quality".

(Continued)

*Primary Examiner*—Jerome Grant, II
(74) *Attorney, Agent, or Firm*—David W. Victor; Konrad Raynes & Victor LLP

(57) ABSTRACT

Disclosed is a method, system, and program for generating a table for enhancing the print quality of input raster pel data. An output value is generated for different patterns of pel data. Each output value indicates a sub-pulse width power to charge a sub-pel region within a pel and position information indicating the justification of the sub-pel region within the pel. A look-up table is formed from the generated output values that enhances print quality.

40 Claims, 9 Drawing Sheets

OTHER PUBLICATIONS

U.S. Appl. No. 09/176,649, entitled "Method and System for Improved Performance of Adjustable Printer Clocks in an Electrophotographic Device", filed Oct. 21, 1998.

M. Takahashi et al., "Full–Color Ink–Jet Printer", Journal Paper, NEC Research and Development, No. 80, pp. 38–41, Jan. 1986 (abstract).

D. McMurtry et al., "Technology of the IBM 3800 Printing Subsystem Model 3", Journal Paper, IBM Journal of Research and Development, vol. 28, No. 3, pp. 257–262, May 1984 (abstract).

R.C. Miller, Jr., "Introduction to the IBM 3800 Printing Subsystem Models 3 and 8", Journal Paper, IBM Journal of Research and Development, vol. 28, No. 3, pp. 252–256, May 1984 (abstract).

Y.L. Yao, "High Resolution Display and Printing Technique", Journal Paper, IBM Technical Disclosure Bulletin, vol. 23, No. 11, pp. 5225–5226 (abstract).

U.S. Appl. No. 09/535,859, filed Mar. 27, 2000.

U.S. Appl. No. 09/535, 858, filed Mar. 27, 2000.

M.J. Stanich, "Print–Quality Enhancement in Electrophotographic Printers", IBM J. Res. Develop., vol. 41, No. 6, Nov. 1997, pp. 669–678.

* cited by examiner $$\underline{350}$$

Output Array =

Input Array +

$$\text{Part I} \begin{cases} [fA(\text{starting\_value} - W_{AW})*\text{Array}_{AW} + fA(\text{starting\_value} + W_{AK})*\text{Array}_{AK} + \\ fB(\text{starting\_value} - W_{BW})*\text{Array}_{BW} + fB(\text{starting\_value} + W_{BK})*\text{Array}_{BK} + \\ fC(\text{starting\_value} - W_{CW})*\text{Array}_{CW} + fC(\text{starting\_value} + W_{CK})*\text{Array}_{CK}] - \end{cases}$$

$$\text{Part II} \{ [fA(\text{starting\_value})*\text{Array}_{AK} + fB(\text{starting\_value})*\text{Array}_{BK}) + fC(\text{starting\_value})*\text{Array}_{CK}] +$$

$$\text{Part III} \{ [f0(\text{starting\_value} + W_{AK} + W_{BK} + W_{CK} - W_{AW} - W_{BW} - W_{CW}) - f0(\text{starting\_value})] $$

FIG. 9

METHOD, SYSTEM, PROGRAM, AND DATA STRUCTURE FOR PRODUCING A LOOK-UP TABLE TO ENHANCE PRINT QUALITY

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Using Look-up Tables to Filter Raster Data", by Richard S. Lucky, Larry M. Ernst, and Danielle K. Dittrich, having U.S. application Ser. No. 09/535,858; and "Method, System, And Program For Reducing Toner Usage in Print Output", by Larry M. Ernst, Danielle K. Dittrich, and Richard S. Lucky, having U.S. application Ser. No. 09/535,859.

BACKGROUND OF THE INVENTION

1. Field of the Invention

The present invention relates to a method, system and program for improving print quality enhancement and, in particular, generating a look-up table that enhances print quality.

2. Description of the Related Art

To print an image, a print engine processor, referred to herein as a raster image processor, converts the image in a page description language or vector graphics format to a bit mapped image indicating a value to print at each pixel of the image. Each bit representing a pixel that is "on" is converted to an electronic pulse. The electronic pulses generated from the raster pel data at which to deposit toner turns the laser beam on to positively charge the surface of a rotating drum, which is an organic photo-conducting cartridge (OPC), that has a coating capable of holding an electrostatic charge. The laser beam turns on and off to beam charges at pixel areas on a scan line across the drum that will ultimately represent the output image. After the laser beam charges all pels on the scan line indicated in the raster data, the drum rotates so the laser beam can place charges on the next scan line. The drum with the electrostatic positive charges then passes over negatively charged toner. The negatively charged toner is then attracted to the positive charged areas of the drum that form the image. The paper, which is negatively charged, passes over the roller drum and attracts the toner as the areas of the roller drum with the toner are positively charged to transfer the toner forming the image from the roller drum to the paper.

Many laser printers may filter the bit map images using a look-up table to alter the pulses generated for each pixel to accomplish a certain filtering result. For instance, filters can be used to provide an economy mode where toner is reduced, remove jagged edges, improve print quality or reduce the density of images. Typically, the laser printer will gather an area of data and replace either one or all the pulse values for the pixels based on the gathered area of pixel data matching a value in the look-up table. Print quality enhancement look-up tables adjust input pels based on the values in surrounding pels to provide anti-aliasing, boldness control, and remove jagged edges.

Notwithstanding current print quality enhancement algorithms for generating values in a look-up table, there is a need for an improved methodology for generating look-up tables to adjust input pel values to enhance print quality.

SUMMARY OF THE PREFERRED EMBODIMENTS

To overcome the limitations in the prior art described above, preferred embodiments disclose a method, system, program, and data structure for generating a table for enhancing the print quality of input raster pel data. An output value is generated for different patterns of pel data. Each output value indicates a sub-pulse width power to charge a sub-pel region within a pel and position information indicating the justification of the sub-pel region within the pel. A look-up table is formed from the generated output values that enhances print quality.

In further embodiments, the position information is used to cluster sub-pel regions next to each other in adjacent pels and justify an edge pel toward a black filled region adjacent to the edge pel.

In still further embodiments, the output value for the sub-pulse width power is generated by adjusting a base sub-pulse width power by weights indicating the affect of a subject black pet on surrounding pels.

Yet further, the output value is generated for the subject black pel affecting the surrounding pels. The surrounding pels comprise multiple regions of pels. There is a separate weight for each region that is used to adjust the base sub-pulse width power of the subject black pel to produce the output value.

Preferred embodiments encode a look-up table (LUT) with output values for a subject black pel in order to enhance print quality by adjusting the subject pel based on the pattern of the surrounding pels. The output values in the LUT provide sub-pulse widths used to generate sub-regions within a pel. Preferred embodiments provide position information to position the sub-pel regions within the pel to improve print quality and to reduce electromagnetic radiation. Further, preferred embodiments determine the output values for the subject pel by taking into account the affect of the subject black pet on surrounding pels.

Preferred embodiments provide an equation to use to generate weights that reflect the affect of a center black pel on surrounding regions of pets, such that the solution of the weights in the equation seeks to adjust black pels to achieve a desired print quality enhancement output goal, such as a desired halftone density curve. These weights are then used to adjust output values for subject black center pels to accomplish the print quality enhancement output goal.

BRIEF DESCRIPTION OF THE DRAWINGS

Referring now to the drawings in which like reference numbers represent corresponding parts throughout:

FIG. 9 illustrates the equation that is solved to calculate the weights used to adjust the base power level for black in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Using Multiple Look-Up Tables to Filter an Image

Figure 1:
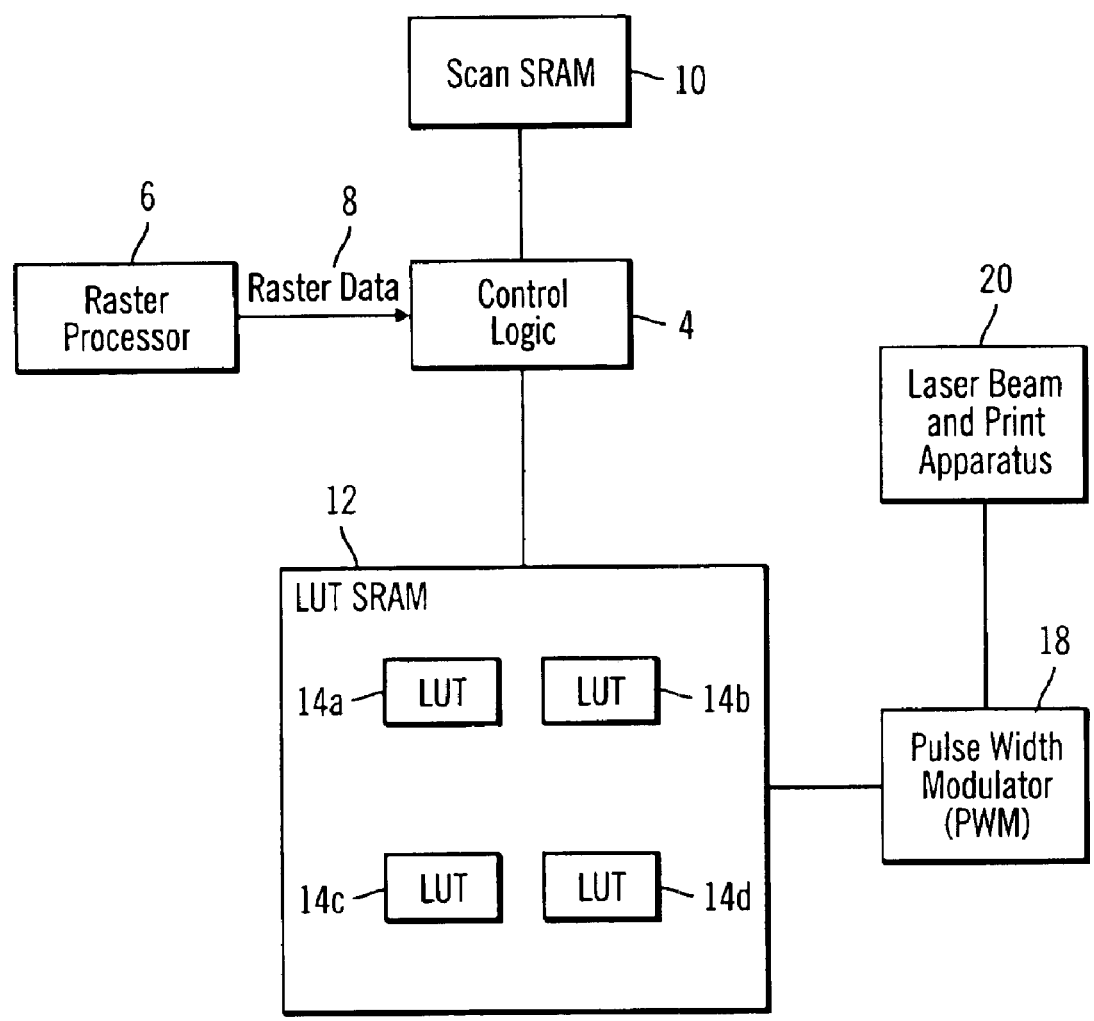
FIG. 1 illustrates a printing computing environment in which preferred embodiments of the present invention are implemented.

FIG. 1 illustrates a printing computing environment in which preferred embodiments are implemented. Control logic 4 comprises a programmable chip, such as a field programable gate array (FPGA) chip, which includes logic to perform the preferred embodiment pel filtering operations. The raster processor 6 generates raster data 8 from vector graphics or page description language commands. The raster data 8 comprises scan lines of pels, where each pel has an "on" or "off" value and location information of the pel in the scan line. The control logic 4 accesses scan lines of raster data 8 and transfers the pels to a scan static random access memory (SRAM) 10. The control logic 4 will access data from the scan SRAM 10 and compare the accessed pel data with values in one of a selected look-up table (LUT) 14a, b, c, d that were previously loaded in a LUT SRAM 12. The control logic 4 is encoded with logic to compare accessed pel data with the LUT 14a, b, c or d to determine an output value for input pel data.

In the example of FIG. 1, the control logic 4 uses the LUTs 14a, b, c, d to accomplish a particular type of filter operation, e.g., print quality enhancement of text, images or double dot data, or toner reduction. Print quality enhancement may involve edge smoothing, compensating for density, etc.

The LUT tables 14a, b, c, d specify how to modify a pel based on the values of the surrounding pels. A pel is modified by modifying its pulse width. The modified or unmodified pel data, i.e., pulse width, is then transferred directly from one selected LUT 14a, b, c, or d to the pulse width modulator (PWM) 18 to generate an electronic pulse, i.e., voltage, which controls the laser beam 20 to electrically charge the area of the roller corresponding to the pel as part of the printing process. In preferred embodiments, the PWM 18 is capable of generating sixty-four different pulse widths for a pel having a value of "on".

Figure 2:
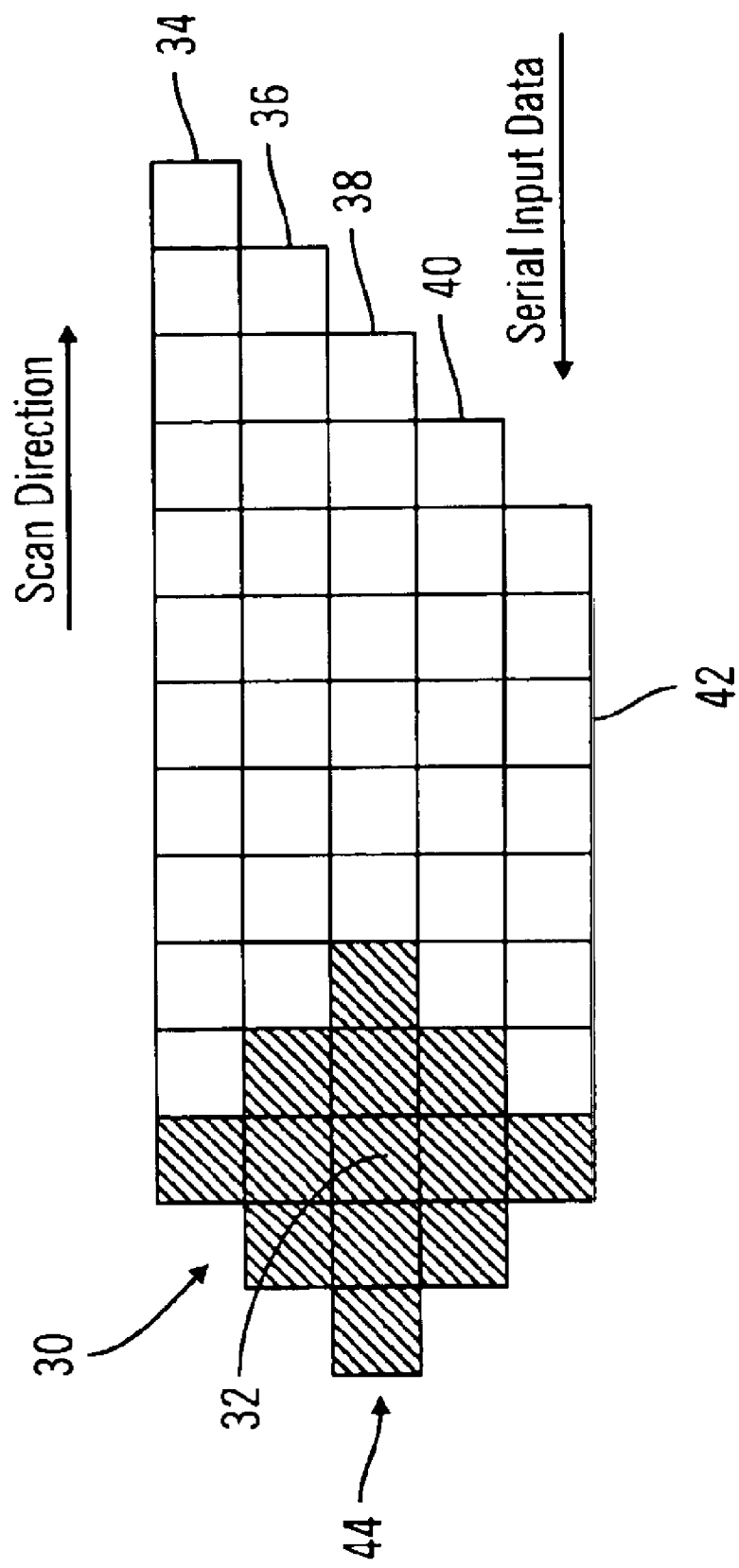
FIG. 2 illustrates a window of pel data accessed for filtering operations in accordance with preferred embodiments of the present invention.

FIG. 2 illustrates how scan line raster data is loaded into the scan SRAM 10 and accessed by the control logic 4. In FIG. 2, each block represents a pel, a white block represents buffered pel data and a darkened block represents one pel the control logic 4 is accessing in a window 30 of pels that will be considered during the filter operation. In preferred embodiments, the control logic 4 accesses a diamond shaped group of adjacent pels 30 from five different scan lines 34, 36, 38, 40, 42 that surround a center pel 32. In preferred embodiments, one or more of the LUTs 14a, b, c or d include an output value for each possible combination of values for the window 30. In the example of FIG. 2, this would require the LUTs 14a, b, c, d to provide $2^{13}$ possible output values as there are $2^{13}$ different possible arrangements of the thirteen pels in the window 30. Thus, the LUTs 14a, b, c, d specify an output value for each unique combination of the pels in the window 30. The output value provides an adjusted pulse width for the center pel 32 in the window 30. The purpose of the window is to provide an adjusted pulse for the center pel 32 based on the surrounding pels that have the most affect on the center pel 32.

In preferred embodiments, the window 30 is shaped as a diamond to approximate the circular shape of a charge the laser creates on the roller and the shape in which toner is applied to a pel. The toner applied to a pel may extend out in a circular range and affect other pels. Thus, based on the value of the pels surrounding the center pel 32, the LUTs 14a, b, c, d provide an adjusted pulse width value for the center pel 32 to accomplish the purpose of the LUT, e.g., print quality enhancement, toner reduction, etc., in a manner known in the art In preferred embodiments the scan SRAM 10 comprises a 32K×8 SRAM and a set of shift registers. The raster data 8 is delivered in a serial bit stream to the scan SRAM 10, such that eight bits are shifted in and written to the byte wide scan SRAM 10 every eight clocks. The control logic 4 gathers the raster data 8 one bit at a time and writes to the scan SRAM 10 once every eight bits. The pels in the window 30 are read by reading the first four scan lines 34, 36, 38, and 40 one at a time. The bottom scan line 42, which provides one pel to the window 30, is the input scan line being written to the SRAM 10 by the control logic 14. The window 30 shifts right through the scan lines. After processing all pels in a scan line as the center pel 32, the window 30 would shift down in the transport direction to start including subsequent scan lines in the window 30. In this way, every pel in the bitmap at one point is the center pel 32 in the window 30 that is adjusted based on the values of the surrounding pels in the window. In preferred embodiments, only the original pel values from the raster data 8 are used in each window 30. Thus, after the center pel 32 is adjusted, when that previous center pel becomes a pel surrounding a center pel 32 in the window 30, the original value of that center pel from the raster data 8 is used, and not the adjusted pulse width value.

The preferred embodiment diamond shaped window 30 provides an improved data sampling over current windows used in filtering pels that are typically rectangular or square shaped, because the diamond shape approximates the actual shape of the laser charge imprint. Thus, the pels most affected by the pulse used to produce the center pel 32 are in the circular diamond shaped window 30. Because, in preferred embodiments, the LUTs provide an output value for every possible combination of pels in the window, minimizing the number of pels in the window by using a diamond shaped window as opposed to a rectangular shape, which includes a greater area of pels, makes it feasible for the LUTs 14a, b, c, d to provide one output value for every possible combination of pels in the window 30. Further, the diamond shaped window 30 considers the affect of surrounding pels to the north, south, east, and west of the center pel 32 as would a rectangular shaped window, but excludes four pels that would be included in a rectangular window that have less of an affect on the center pel 32 as they are farther from the center pel 32 than any pels in the diamond shaped window 30 and are generally outside of the circular radius of a charge for a pel.

In preferred embodiments, the control logic 4 may, in the middle of generating pels within a page and/or a scan line, switch the LUT 14a, b, c, d to alter the type of filter operation. For instance, this would allow a single scan line to include image data that needs to be generated with high quality that would require the image print quality enhancement LUT as well as content that may be generated in an economy mode using the toner reduction LUT. A toner reduction LUT would tend to reduce the pulse width for each pel, thereby reducing the size of the charged area on the roller exposed to the laser beam and the amount of toner that would gather at the charged area.

To provide information on which print mode to use, e.g., print quality enhancement for image, text or double dot or toner reduction, the raster data 8 may include switching points and a new print mode for a switching point. A switching point would comprise a scan line, i.e., transport position, and pel position within the scan line at which to change the print mode. An additional mode is bypass mode. In bypass mode, the serial data is sent directly to the printer engine without being stored in the scan SRAM 10 and without being filtered using the LUTs 14a, b, c, d. Initially, the control logic 4 is in bypass mode until changed as a result of a switching point. Further, upon initialization, all the LUTs 14a, b, c, d are loaded into the LUT SRAM 12 from a non-volatile storage location, such as disk or flash memory. In this way, all the LUT tables 14a, b, c, d are readily accessible to the control logic 4 and may be switched within the pel frequency to allow the switching of LUT tables, and hence filtering operations, between pels.. The copending patent application entitled "Method, System, And Program For Using Look-up Tables to Filter Raster Data", and which was incorporated by reference above, provides further details of the process of switching the LUTs 14a, b, c, d when processing the pels in a scan line.

In preferred embodiments, because all the LUT tables 14a, b, c, d are accessible from the same high speed memory, they control logic 4 may switch LUTs 14a, b, c, d within the pel frequency, thereby allowing the control logic 4 to switch LUTs 14a, b, c, d, and hence filtering operations, between adjacent pels. Further, the control logic 4 may also switch between the end of one page and the beginning of another. In preferred embodiments, the control logic 4 only calibrates the pulse width modulator (PWM) 18 at start-up. No calibrations are performed when switching between LUTs 14a, b, c, d, as such switching, in preferred embodiments, occurs within the pel frequency, thereby allowing the control logic 4 to switch LUTs 14a, b, c, d between pels without negatively affecting printer throughput.

Algorithm for Generating Print Quality Enhancement LUTs

As discussed, one of the LUTs 14a, b, c or d is used to enhance the print quality. The PQE LUT, as well as the other LUTs 14a, b, c, d, are generated at the factory using a computer separate from the printer into which the LUTs will be loaded. This computer would include a LUT generator program, shown as element 302 in FIG. 7 discussed below, to encode the PQE LUT with an output sub-pulse width value for each possible pattern of surrounding pels in the diamond shaped window 30. Further, each output value in the PQE LUT includes two components, a position component and a power level, i.e., subpulse width, component. In preferred embodiments, the power level component comprises a sub-pulse width that is a percentage of the full power value, i.e., a sub-pulse width that produces a sub-pel region where toner is attracted within the pel. The position component of the PQE LUT output value indicates the relative position in the pel of the sub-pel region produced by the power value component. This relative position may be right, centered or left justified within the pel.

Figure 3:
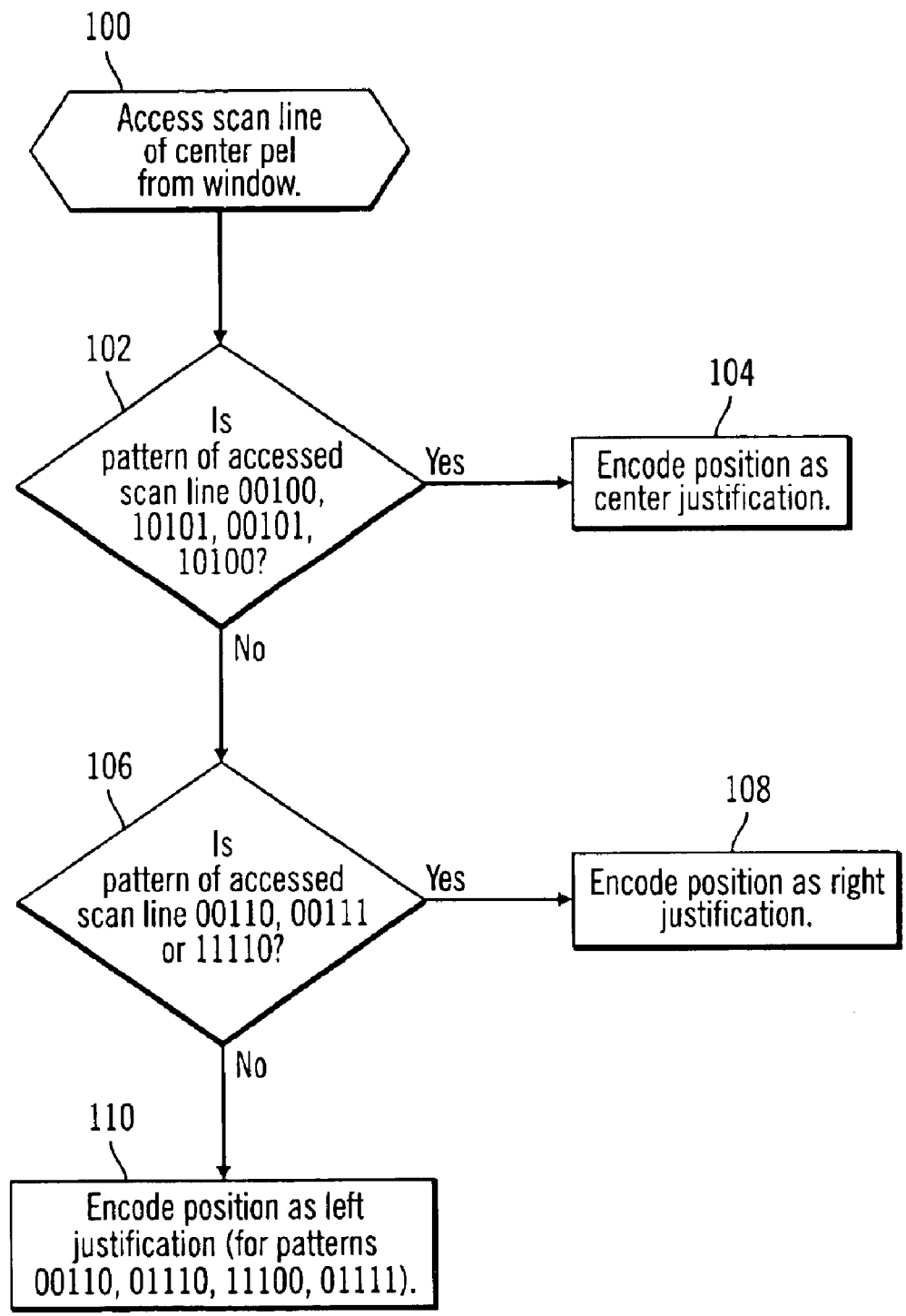
FIG. 3 illustrates logic to generate position information for sub-pel regions produced by the output pulse widths in the print quality enhancement (PQE) look-up table (LUT) in accordance with preferred embodiments of the present invention.

In preferred embodiments, to encode the position information for each output value in the PQE LUT table, the LUT generator software program only the value of the surrounding pels on the same scan line 44 as the center pel 32 (FIG. 2) in the window 30. FIG. 3 illustrates logic implemented in the LUT generator program to encode position information for the output value if the center pel 32 is black based on the pattern of black surrounding pels in the same scan line 44. Control begins at block 100 with the LUT generator program considering the scan line 44 of the center pel 32 for each possible combination of input windows 30. If the pattern is 00100, 10101, 10100, 00101 (at block 102), i.e., the center pet 32 is a single pel, then the position is center justified (at block 104). If the pattern is 00110, 00111 or 1110 (at block 106), then the position is right justified (at block 108). Otherwise, if the pattern is 00110, 01110, 11100, 01111, the position is left justified (at block 110).

Figure 4:
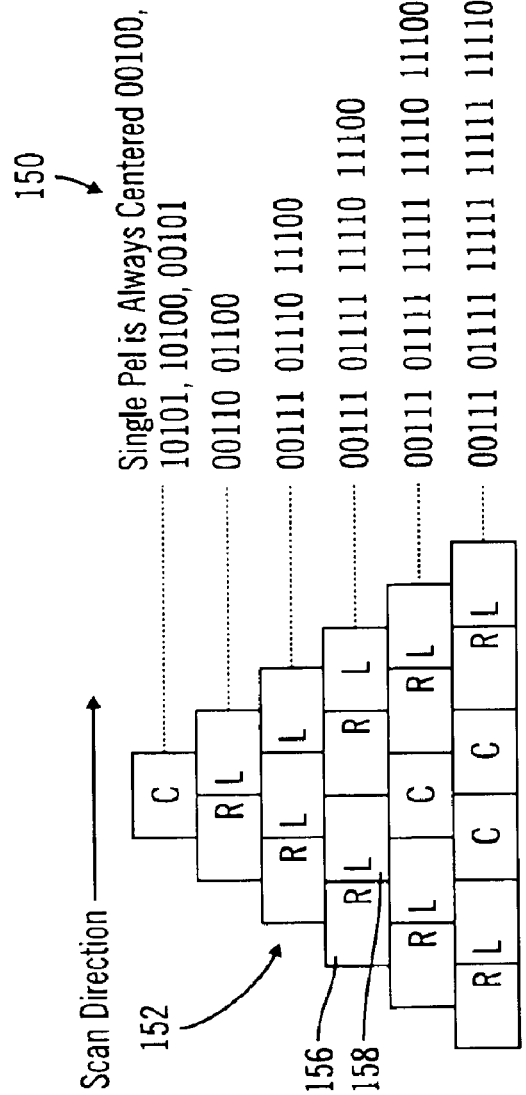
FIG. 4 illustrates an example of how sub-pulse regions are aligned according to the position information in the PQE table in accordance with preferred embodiments of the present invention.

With the logic of FIG. 3, if the center pel is on an edge of an all black area, at patterns 00110, 00111, 11100, and 01100, then the center pel is justified toward the black area. Pels that fall in black areas, not near edges are centered. One advantage of this positioning scheme is that an edge pel is positioned away from the adjacent white pel to avoid the edge sub-pel region from bleeding over into the white adjacent pel, which would reduce the sharpness of the edge. FIG. 4 illustrates how the pels are justified on a scan line as a result of the logic in FIG. 3 to generate the position information. The pel patterns 150 on the right show the order of pel patterns as the window 30 moves to the right across the scan line. The result of justifying the pels in the scan line using the logic of FIG. 3 is shown on the left 152 of FIG. 4, where "R" is right, "L" is left, and "C" is centered. As shown in FIG. 4, the logic of FIG. 3 assigns justifications to cluster the sub-pel regions in adjacent pels next to each other, as shown by the right and left alignment.

The purpose of clustering adjacent pels is to avoid the problem of constantly having to switch the laser beam on and off in each pet when generating sub-pel regions within each pel. Switching the laser beam on and off increases electromagnetic radiation (EMI) and pollution. In many countries, printers must meet certain EMI pollution standards. In fact, EMI pollution problems have made the use of sub-pulse width modulation, where the laser is turned on and off within each pel, undesirable. This problem is further discussed in the co-pending patent application entitled "Method, System, And Program For Reducing Toner Usage in Print Output", which was incorporated herein by reference above.

Preferred embodiments help reduce EMI pollution by aligning the sub-pulse region in one pel next to the sub pel region in one adjacent pel. With this alignment, the laser beam does not have to be turned off when generating the sub-pulse width in the adjacent pets as the laser may remain on when generating the sub-pulse regions in the adjacent pels. Thus, the laser turns on to generate the sub-pulse region right justified in pel 156 and remains on to generate the sub-pel region left justified in pel 158. The logic of FIG. 3, thus, produces an alignment that minimizes the number of times the laser must be turned off when generating sub-pulse regions within pels.

The logic of FIG. 3 further center aligns the pet when the center pel is in the center of an all black region, i.e., pattern 11111.

In addition to determining the alignment of the sub-pel region for each output value of the PQE LUT, the LUT generator program must also produce the power levels or sub-pulse width modulation levels, for each value. If the pel being modified is white, then the laser power is zero. Otherwise, the base laser power for black pels is set at some level less than full power. In determining the appropriate amount of pulse width, i.e., laser power, the LUT generator program adds or subtracts weights to a base power level value by considering the surrounding pels and the affect of the center pel 32 on the surrounding pets in the data window 30.

Figure 5:
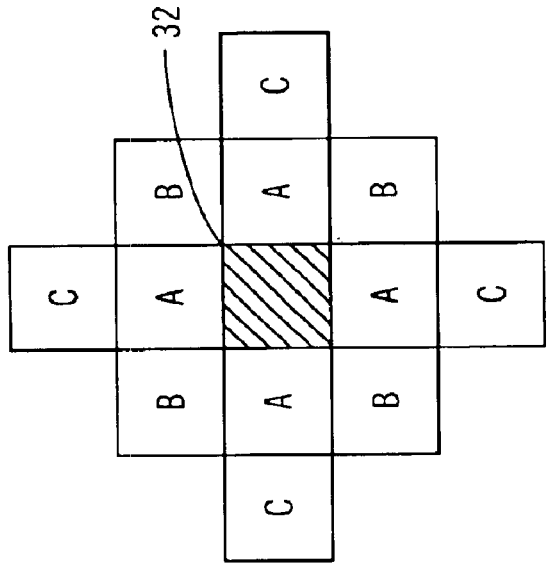
FIG. 5 illustrates how the data window of pels is divided into regions affected by a black center pel in accordance with preferred embodiments of the present invention.

The LUT generator program uses different weights for different regions of the surrounding pels in window 30. FIG. 5 illustrates three regions A, B, and C including the surrounding pets of the window 30. Region A includes the pels, labeled as "A", that immediately surround the center pel 32 in the first order horizontal and vertical directions. Region B includes pels in the first order diagonal direction from the center pel, labeled as "B", and Region C includes the second order pels in the horizontal and vertical directions. The pels in Region A are most affected by the black center pel 32 as the center of Region A pels are closer to the center pel 32 than the center of Region B pels which are at a diagonal position from the center pel 32. Region C pels are least affected by the black center pel 32. Thus, FIG. 5 illustrates different regions of the black center pet 32 effect on surrounding pels.

The arrangement of FIG. 5 assumes that the center pel has an equal effect on the pels within equidistant regions, with the effect lessening as the regions move outward from the center pel. This assumption requires that the laser produces a spot on the photoconductor roller that has a symmetrical Gaussian profile. However, if the spot profile produced by the laser was asymmetrical, then the affect of the center pel 32 on pels within a region A, B or C would be different.

To determine the laser power value for the center pel 32 based on the values of the surrounding pel in each possible pattern for the window 30, the LUT generator program would start with a base power level for the black center pel 32, e.g., 65% of full power, and then adjust this base power level with a region weight. There is a weight for each Region A, B, C and for each color value W (white) or K (black) that reflects the affect a black center pel 32 has on each pel within a Region A, B, C, respectively. Different weights are provided for black or white surrounding pels because the black center pel 32 has a greater visual affect on white surrounding pels. The visual effect of the center pel "spilling" over into the surrounding pels is greater for white surrounding pels that have no color value.

To enhance print quality and limit the extent to which the center pel will adversely affect white surrounding pels, the base power level is reduced by the weight for each surrounding white pel. Reducing the base power level for surrounding white pels reduces the extent to which the black center pel "spills" over into the white surrounding pel. To the extent the surrounding pels are black, print quality is enhanced by ensuring that there is no white space between adjacent black pels. For this reason, the base power level is increased by the weight for each surrounding black pel. The weight used depends upon the region, such that a region closer to the black center pel will have a greater weight, i.e., is more affected by the black center pel, than regions further away from the black center pel.

Below are the six weights that indicate the effect of a black center pel on a pel within a particular region, depending on whether the pel in the region is black or white, and that are used to adjust the base power level to produce the output value.

$W_{AK}$—is weight for black pels in Region A.
$W_{AW}$—is weight for weight pels in Region A.
$W_{BK}$—is weight for black pels in Region B.
$W_{BW}$—is weight for weight pels in Region B.
$W_{CK}$—is weight for black pels in Region C.
$W_{CW}$—is weight for weight pels in Region C.

Figure 6:
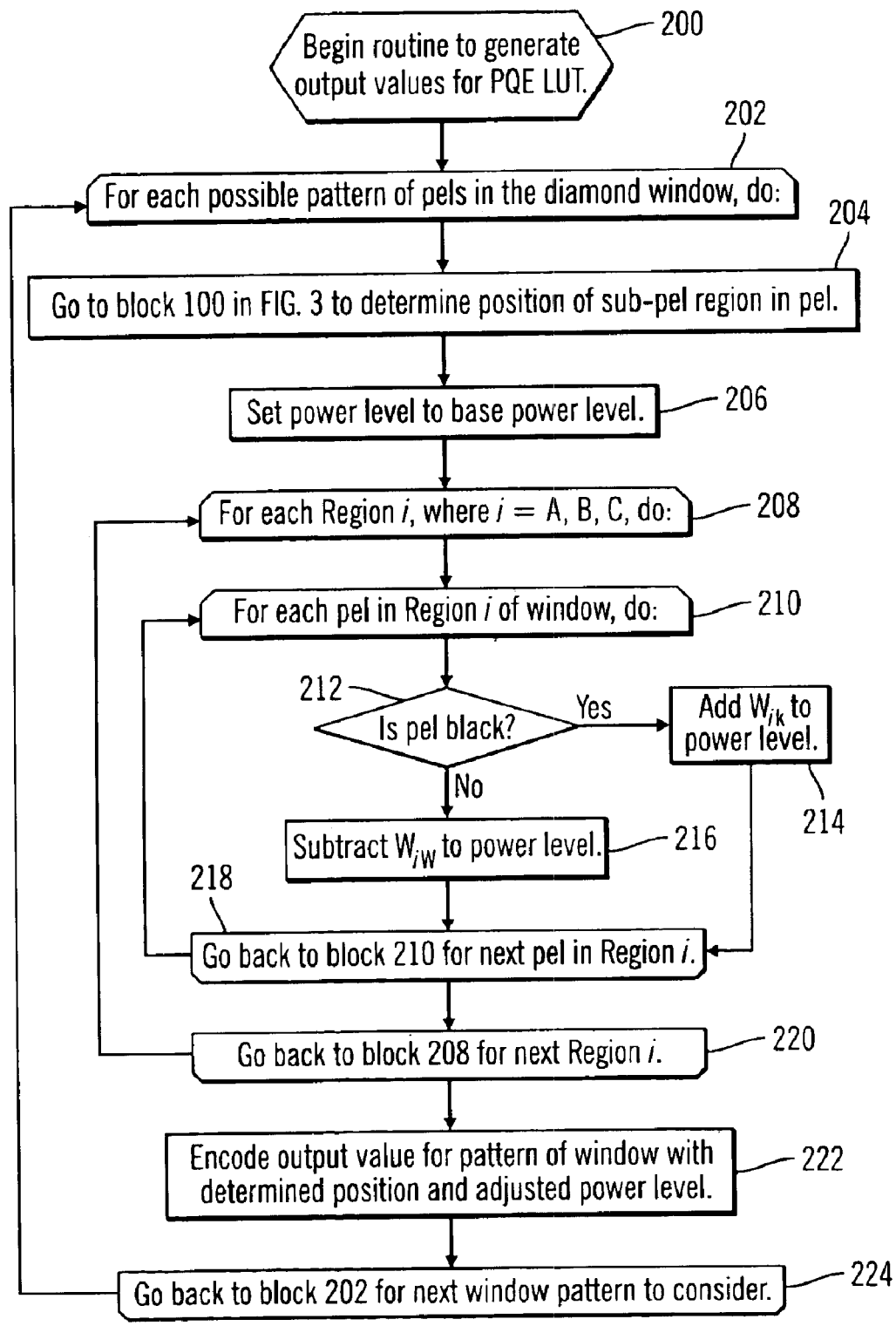
FIG. 6 illustrates logic to generate output pulse width values and position information in a PQE LUT for each possible pattern of pels in the window in accordance with preferred embodiments of the present invention.

FIG. 6 illustrates logic in the LUT generator program to produce the output value for each pattern of pels in window 30 using the above weights indicating the affect on black and white pels in each region and the position encoding logic of FIG. 3. Control begins at block 200 with the LUT generator program beginning a routine to generate an output value for each possible pattern of pels in window 30. For each possible pattern of pels in the window, the LUT generator performs a loop at blocks 202 through 224. At block 204, the LUT generator program executes the logic in FIG. 3 to determine the position to justify the sub-pel region within the pel.

The LUT generator program performs steps 206 through 220 to determine the output power level in the LUT to provide for the center pel 32. At block 206, the LUT generator sets the power level to the base power level that is a percentage of the full power level, such as 65%. The LUT generator program performs a loop at blocks 208 through 220 for each Region i, where i is equal to A, B or C. The LUT generator program then considers each pel in Region i at blocks 210 through 218. For each pel in Region i, the LUT generator program adds (at block 214) the black weight for the region, $W_{ik}$, to the power level. Otherwise, the white weight for the region, $W_{iw}$, is added (at block 216).

After adjusting the power level with the weight based on the value (black or white) and location (Region A, B or C) of the surrounding pel, the LUT generator program encodes the output value for the pattern in the LUT with the determined position justification and adjusted power level.

To generate the weights, the LUT generator program will mathematically calculate the weights from the characteristics of the printer using interpolation, such as non-linear least squares interpolation. When applied, the weights will modify the shape of the base power level to generate output values that produce a desired output curve. In preferred embodiments, the desired output curve expresses a desired density at each greyscale level. The weights are determined such that they adjust the base power level based on the surrounding pel values to produce the desired output density in a manner that enhances print quality.

Figure 7:
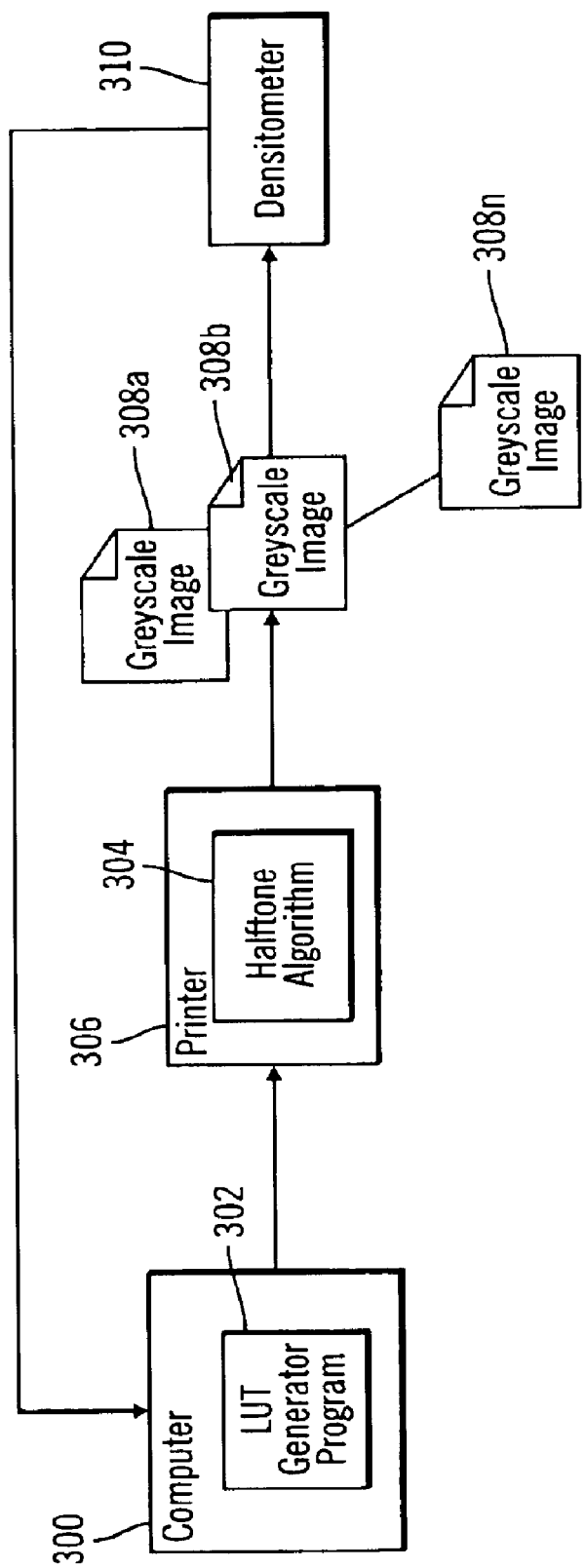
FIG. 7 illustrates the components used to determine the weights used to adjust the base power value to produce print quality enhanced output values in accordance with preferred embodiments of the present invention.
Figure 8:
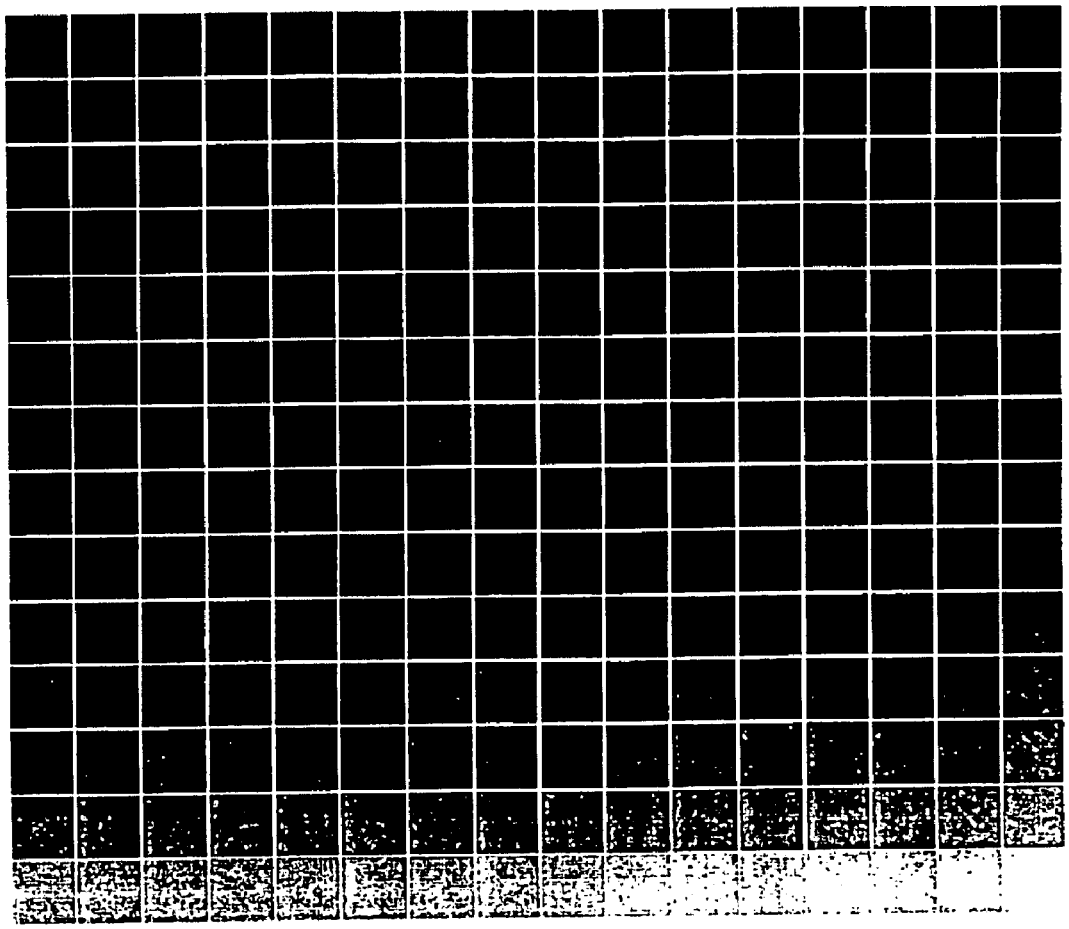
FIG. 8 illustrates a reproduction of greyscale levels in a manner known in the art.

FIG. 7 illustrates a preferred embodiment of the workflow used to determine the weights that are used in FIG. 6 to generate the values in the PQE LUT. A computer 300 includes the LUT generator program 302, discussed above, that uses the halftone algorithm 304 in the printer 306 to produce greyscale images 308a, b . . . n that reproduce each of the 256 greyscale levels. The LUT generator program 302 includes the logic of FIGS. 3 and 6, discussed above. An example of a greyscale image is shown in FIG. 8. The LUT generator program 302 would produce greyscale images at different power levels for black. The greyscale patterns between black and white would be determined from the power level set for black. For instance, to provide the greatest degree of accuracy, the LUT generator program 302 can generate a greyscale image for each possible power level. For instance, if the pulse width modulator can generate power levels 1/64 increments of the full power level, then the LUT generator program 302 can generate up to 64 greyscale images, the maximum number of power level increments. Alternatively, the LUT generator program 302 can generate greyscale images 308a, b . . . n at fewer power level intervals, including the base power level. The greyscale images 308a, b . . . n would then be scanned by a densitometer 310 to measure the density at each greyscale level for each greyscale image 308a, b . . . n and feed the measured density into the LUT generator program 302 to use in modeling the toner reproduction curve to calculate the weights indicating the affect of a center pel on black and white pels in the Regions A, B, C.

Below is a high level view of the print quality enhancement equation (1) the LUT generator program 302 solves to determine the weights. Equation (1) provides a model of the affect of the weights on an Input Array comprising the 256 levels of the greyscale image produced with the base power level for black, e.g., 65%. The Output Array comprises the desired density at each greyscale level for the optimal print output result. The Input Array is adjusted using the weights to reach the desired Output Array. Model Equation (1) provides an overview of the print model equation used to interpolate the value of the weights to fit the input data to print to the desired output for each level of greyscale.

Output Array=Input Array+[Array of Affect of Weights on Surrounding Pels in Regions A, B, C]+[Array of Affect of Weights on Center Pel]     (1)

Model (1) shows that the desired Output Array is a function of the Input Array at the base power level, i.e., base pulse width. An array, including an element for each greyscale level, comprising the affects of the added weights to the surrounding pels in Regions A, B, C is added to the Input Array to add the affect of the weights on the surrounding regions. An array of the affect of the weights on the center pel for each greyscale level is added to include the effect of the weights on the surrounding pels.

The affect of the weights in Regions A, B, C can be calculated from the density of the pels in the Regions A, B, C after adjusting the center pet with the weights minus the density of the pels in Regions A, B, C as a result of the pels themselves. Likewise, the affect of the weights on the center pel can be calculated from the density of the center pel after adjusting the center pel with the weights minus the density of the center pet before the weights were applied. In this way, the density affect caused by the weights on the Regions A, B, C and center pels are determined for each greyscale level and used to adjust the Input Array to reach the desired Output Array.

The model equation may be expressed as equation 350 shown in FIG. 9, which is divided into three parts. The functions $fA(x)$, $fB(x)$, and $fC(x)$ define the density added to each region A, B, C, respectively, for a given power level x. $Array_{iw}$ represents the percentage of white pels in Region i for each greyscale level, thus comprising a 256 element array and $Array_{ik}$ represents the percentage of black pels in Region i for each greyscale level, thus comprising a 256 element array. The starting_value is the base power level of a black pel before any adjustments are made, expressed as a percentage of the full power level, e.g., 65%.

Thus, Part I of the equation represents the density of the pets in the Regions A, B, C after adjusting the center pel with the weights, which are constants, for each greyscale level. Part II of the equation represents the density resulting from the pels in the Regions A, B, C. Part II is subtracted from Part I to determine the density difference produced in the surrounding Regions A, B, C from the adjustments to the center pel. Part III comprises the density of the center pel as adjusted with the weights minus the density without the weights, producing the affect of the weights in the center region. Part III is added to add the effect of the weights on the center pel. The result of Parts I, II, and III is the affect of the weights on the center pel and surrounding Regions A, B, C for each greyscale level, which is then applied to the Input Array to produce the desired output Array for each greyscale level.

Figure 10:
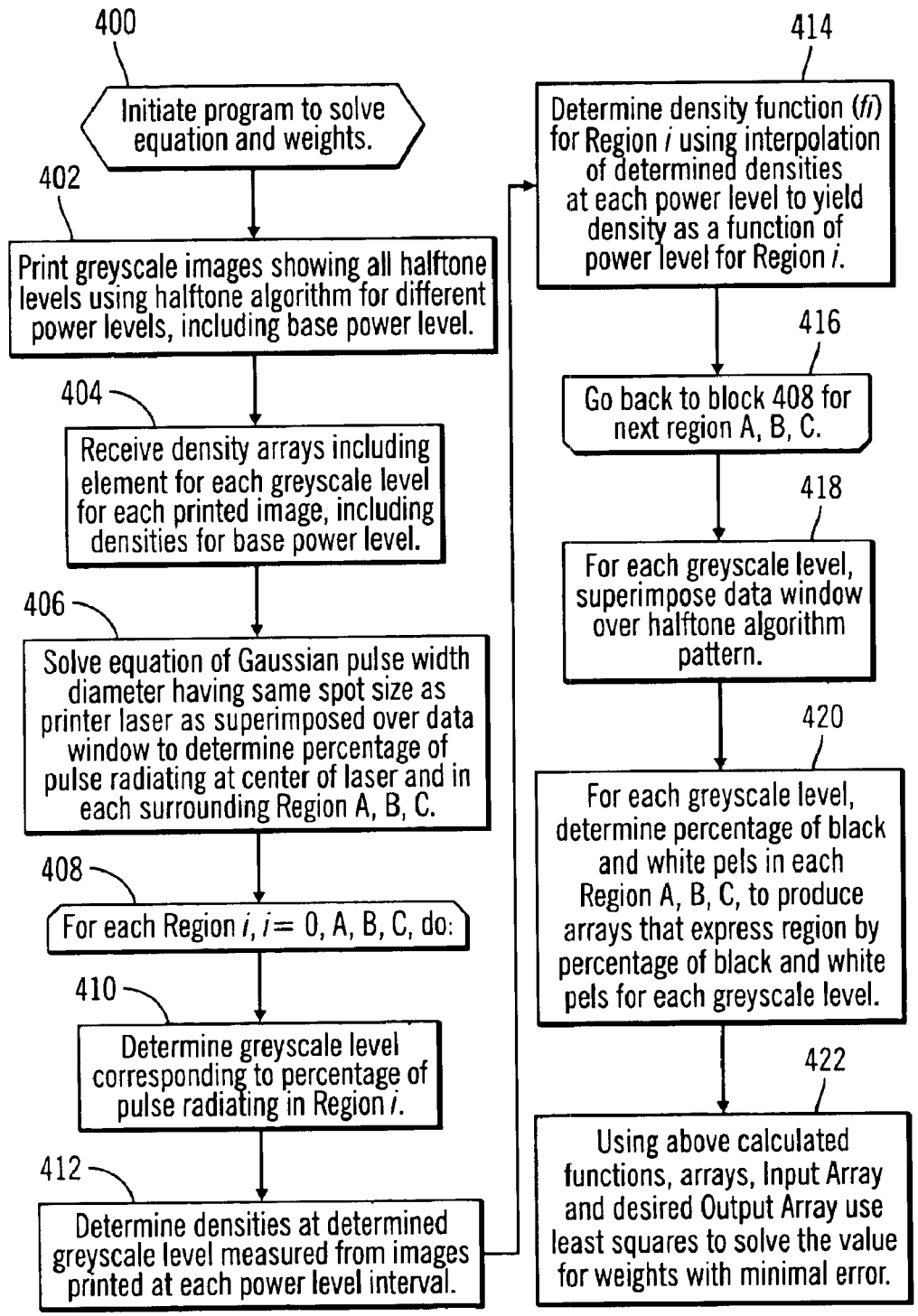
FIG. 10 illustrates logic to determine the functions, arrays, input and output values in the equation in FIG. 9 that is solved to determine the weights that are used to adjust the base power levels in accordance with preferred embodiments of the present invention.

FIG. 10 illustrates logic implemented in the LUT generator program 302 to solve the equation 350 and generate the six weight constants. After determining the weights for each region and color (black or white), the LUT generator program 302 would then execute the logic of FIG. 6 to produce the values in the PQE LUT from the weights. Control begins at block 400 with the LUT generator program 302 being invoked to solve the weights for the equation 350 (FIG. 9). The LUT generator program 302 would print (at block 402) greyscale images 308a, b . . . n showing all halftone levels, such as shown in FIG. 7, at different power level intervals, including the base power level. The densities of each greyscale level may be measured using a densitometer 310 and then inputted (at block 404) into the LUT generator program 302 through an interface on the computer 300. For instance, a human operator may feed the greyscale images 308a, b . . . n into the densitometer 310 and then electronically transfer or manually enter the densities measured at each greyscale level to the computer 300.

The LUT generator program 302 further determines (at block 406) the percentage of the laser pulse in the center region (Region 0) and Regions A, B, C. This determination is made by superimposing the symmetrical Gaussian pulse of the laser over the window 30 of data to determine which percent of the laser power directed toward the center pel falls within Regions A, B, C. The Gaussian pulse has a diameter equal to the spot size of the laser for the printer 306 being tested. The power that falls in each Region 0, A, B, C may be determined by equation (2) below which relates the laser power (P) to the distance from the center of the pel (r) for a Gaussian distribution.

$$P = e^{-(\frac{r}{a})^2} \quad (2)$$

The variable "a" in equation (2) is a proportionality constant. The power level (P) at each region can be determined by using the radius of the edge of the region from the center pel. This equation (2) may, thus, be used to determine the percentage of laser power that falls into each Region 0, A, B, C, which are at different radius (r) positions from the center pel. The constant a of equation (2) would take into account the particular characteristics of the printer 304 laser and is used in the equation (2), and can be initially solved for a given relative power level and radius.

For instance, if the printer produces a power level (P) of 50% of maximum power (P) when the radius is 45.07 μm from the center of the pulse, then the constant a can be calculated as shown in equation (3) below:

$$a = \frac{r}{\sqrt{-\ln(P)}} = \frac{45.07}{\sqrt{-\ln(5)}} = 54.135 \ \mu m \quad (3)$$

For a 600 dots per inch (dpi) printer, the pel width is equal to 42.33μm. If the constant a is normalized to pels, then a is equal to 1.28. Now the radius (r) can be expressed as a number of pels from the center. This calculated a constant, which would be based on the printer characteristics, can then be used to determine the power distribution in the different regions. The power levels (P) can now be calculated for Regions A, B, C based on their radius (r) in pels from the center of the center pel. In this way, the constant a, incorporates the characteristics of the printer. Thus, the power level (P) calculated for the different regions are printer specific and based on the characteristics of the printer, which were used to determine the pel factor a.

After calculating the percentage of laser pulse that falls into each Region A, B, C, which is unique to the printer and laser profile of the printer, the LUT generator program 302 then performs the loop at blocks 408 to 416 to calculate the density functions $f0$, $fA$, $fB$, and $fC$ for each Region 0, A, B, C. Each function defines the density the weight adjustments add to a Region 0, A, B, C based on an input power level.

For each Region i, where i is 0, A, B, C, the LUT generator program 302 determines (at block 410) the greyscale level corresponding to the percentage of pulse radiating into Region i. In alternative embodiments, an operator may determine the gray scale level corresponding to the percentage of pulse radiating into Region i, which is then used by the LUT generator 302 to generate the function used to solve the equation. Thus, if the laser pulse directed toward the center pel spilling over into Region A comprises 10% of the pulse, then the corresponding greyscale level would be 255−10%* 255(=25.5), which approximates level 229, where level 255 is white and 0 is black. In alternative embodiments, a operator may manually determine and enter the gray scale level to use and then use a separate program to generate the function. The LUT generator program 302 then determines (at block 412) the densities for the determined greyscale level, e.g., 229, for each printed greyscale image 308a, b . . . n, where the images provide density at different power level intervals. From the determined density values at the different power levels from the greyscale images 308a, b . . . n the LUT generator program 302 uses (at block 414) mathematical interpolation to model a density function $fi$ for Region i, which produces density as a function of power level for the Region i. Steps 410–414 are repeated for each Region 0, A, B, C to determine the density functions $f0$, $fA$, $fB$, $fC$.

At steps 418 and 420, the LUT generator program 32 generates the 256 element arrays $Array_{ik}$ and $Array_{iw}$ for each Region i indicating the percentage of black and white pels in each Region for each greyscale level. At block 418, the LUT generator program 302 superimposes the data window 30 over each greyscale level air pattern produced by the halftone algorithm 304 and then determines (at block 420), for each greyscale level, the percentage of black and white pels in Regions A, B, C to produce the arrays $Array_{ik}$ and $Array_{iw}$ that express by Region i and color W or K, the percentage of white (W) and black (K) pels for a given greyscale level. Using the above calculated density functions $f0$, $fA$, $fB$, $fC$; the arrays for percentage black and white pels in Regions A, B, C—$Array_{AW}$, $Array_{AK}$, $Array_{BW}$, $Array_{BK}$, $Array_{CW}$, and $Array_{CK}$; the Input Array comprising the densities for each halftone level printed at the base power level; the starting_value which is the base power level; and the desired Output Array, the LUT generator program 302 would apply least means square regression to calculate the weights from equation 350 in FIG. 9. The regression and interpolation programs used to solve the density functions and weights may be written in scripts using the Matlab program.** However, alternative programming languages may be used to determine the weights and perform the mathematical functions.

**Matlab is a registered trademark of The Math Works,Inc.

By solving the equation 350 in FIG. 9 to produce the constants for the different weights, the LUT generator program 302 encorporates both the characteristics of the printer, which are defined by the Gaussian power distribution through the regions, the characteristics of the halftone algorithm 304, which is used to generate the greyscale images 308a, b . . . n used in determining the density functions and percentages, and the desired output. When the weights are applied in the logic of FIG. 6 to generate the output values, the weights will produce the desired density that fits the halftone curve expressed in the Output Array. In this way, print quality is enhanced by adjusting the power levels based on the affect on surrounding pels to achieve the desired density for the halftone algorithm 306 and further taking into account the printer characteristics, such as the Gaussian profile of the laser pulse.

Print quality is enhanced by adjusting the power level for each pel, which adjusts the overall pattern density, to fit a desired halftone density curve. Some of the noticeable enhancements include reduction in over bolding, improving stroke width balance, improving image quality without the loss of data, monotonic tone reproduction as the print output is adjusted toward the desired halftone reproduction curve.

After generating the PQE LUT using the algorithms of FIGS. 6 and 10, further adjustments to the power level output values in the PQE LUT may be manually made for special cases. For instance, if the pel is within a checkerboard pattern, isolated, in an all black region, part of a 1 or 2 pel diagonal, horizontal, and vertical black lines, it has been found desirable to manually modify the output power levels. Such modifications are printer specific and based on human observation of the output in such cases and manual "hit-and-miss" efforts. In this way, the output value in certain "special cases" may be further modified by the operator to produce the desired effect and further enhance print quality.

As discussed, the PQE LUT provides both position and power level data for each pattern of pels. Preferred embodiments provide a methodology for print quality enhancement that considers the characteristics of the printer laser beam, the halftone algorithm, and a desired halftone density curve to adjust the power levels for given input patterns. Further, the preferred embodiments use position information to align sub-pel regions produced by the power level in a manner that minimizes EMI radiation and pollution.

Moreover, the preferred embodiment technique is not printer specific, and may be applied to any laser printer and any halftone algorithm, as the equation is modeled on the laser pulse profile and halftone algorithm.

Alternative Embodiments and Conclusions

This concludes the description of the preferred embodiments of the invention. The following describes some alternative embodiments for accomplishing the present invention.

The preferred embodiments may be implemented as a method, system or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

In preferred embodiments a densitometer separate from the printer is used to measure the density of greyscale images. In alternative embodiments, the densitometer components may be included within the printer.

In preferred embodiments, the greyscale images used to generate the density functions were printed from a single printer. In further embodiments, multiple printers of the same model, including the same laser profile and halftone algorithm, may be used to print different copies of the greyscale images. In such case, the density for each greyscale level at the different power levels would be averaged across the output from the multiple printers.

In preferred embodiments, there were three Regions A, B, C considered in modeling the equation. However, in alternative embodiments fewer or additional regions may be considered when determining the effect of a pulse on surrounding pels.

In preferred embodiments, the percentage of the pulse radiation that fell within each Region 0, 1, 2, 3 is determined based on a symmetrical Gaussian pulse equation and model. However, alternative Gaussian equations and additional weights may be used if the pulse is asymmetrical. For instance, if the pulse radiation pattern is non-symmetrical, then the regions may have to be further subdivided to provide further weights.

In preferred embodiments, a PQE LUT was calculated for a single halftone algorithm in the printer to achieve a desired output halftone curve. In further embodiments, further PQE LUT tables may be generated for additional halftone algorithms 304 in the printer 306 or for different desired halftone output curves using the same halftone algorithm 304.

In preferred embodiments, the halftone algorithm has 256 levels of greyscale. In alternative embodiments, different halftone algorithms may be used that produce a different number of greyscale levels.

In preferred embodiments, the PQE LUT included a value for each possible pattern in the data window. In alternative embodiments, the PQU LUT may include the same output value for different print patterns.

In preferred embodiments, there are binary values for each pel. However, in alternative embodiments there may be more than two values for each pel. In such case, the LUTs 14a, b, c, d would have to provide different output values for the multiple possible pel values.

In preferred embodiment, the control logic is implemented as hardware, e.g., a Field Programmable Gate Array (FPGA), Application Specific Integrated Circuit (ASIC), etc. In alternative embodiments, the control logic may be implemented as programmable code in a programmable processor.

In preferred embodiments, there was one LUT 14a, b, c, d for each different type of print mode. In alternative embodiments, there may be multiple LUT tables for the same print mode and, at the same time, different LUT tables for different print modes.

Examples of print modes, such as print quality enhancement and toner reduction were described. However, additional LUTs may be provided for any different type of filtering operation that may be used to modify the pulse width for a pel to alter the appearance of the output and/or reduce the toner used.

In preferred embodiments, there is a LUT SRAM 12 and scan SRAM 10. These SRAMs 10 and 12 may be implemented in the same SRAM chip or dispersed throughout multiple SRAM chips. In alternative embodiments, the LUTs 14a, b, c, d may be maintained in a magnetic memory, as opposed to an electronic memory such as an SRAM. Still further, the LUTs 14a, b, c, d may be encoded in hardware logic, such as ASICs, FPGAs, Electronically Erasable Programmable Read-Only-Memory (EEPROM), etc. In alternative embodiments, any type of volatile memory device may be used for the SRAMs 10 and 12. However, in preferred embodiments, the LUTs 14a, b, c, d are all maintained in the same high-speed memory to allow the control logic 4 to switch between LUTs 14a, b, c, d within the pel frequency to maintain printer throughput. In alternative embodiments, the LUTs may be switched at frequencies less or greater than the pel frequency. The LUTs may be programmed using Verilog, which may then be used to generate the hardware.

In preferred embodiments, the window of data considered has a diamond shape. However, different shaped windows of pel data may be used with the preferred embodiment dynamic LUT table technique. Further, more or less pels may be included in the window than the thirteen pel bits describe above.

In preferred embodiments, the LUTs provide a single output pel value for the center pel in the window. In alternative embodiments, the LUT may provide multiple substitute modified pulse values for multiple pels in the window.

In preferred embodiments, the laser printer uses the laser to write or discharge the photoconductor voltage in the areas of the image defined as black (or areas where toner is to be placed). The toner color could be black, magenta, cyan, yellow, or other convenient color. This process is know in the industry as "discharge area development" (DAD), where toner adheres only to areas where the photoconductor is discharged. An alternative embodiment where the charges are the opposite of the DAD system is known in the art as "charge area development" (CAD). The CAD process is used in all electrophotography copiers. With CAD, the laser is used to write or discharge the photoconductor voltage in image areas that are white (or areas where toner is not be placed). Again the toner color could be black, magenta, cyan, yellow, or any other color. Toner adheres only to areas where the photoconductor is charged, which in the CAD process are those areas not impacted by the laser. In the CAD process, the photoconductor latent electrostatic image is the "negative" of the photoconductor latent electrostatic image in the DAD process.

For the CAD process, the toner reduction LUT would consider patterns that are the opposite of those considered for the DAD process where the center pel is black. Thus, the same pulse width and position information provided for the LUTs 14a, b, c, d described above having a black center pel would be provided for white center pels having a surrounding pattern the opposite of the pattern provided for the black center pel. With the CAD process, the sub-pulse width power would charge those pels which are white so that toner will not be attracted to the sub-pel regions charged by the laser.

In summary, preferred embodiments disclose a method, system, and program for generating a table for enhancing the print quality of input raster pel data. An output value is generated for different patterns of pel data. Each output value indicates a sub-pulse width power to charge to a sub-pel region within a pel and position information indicating the justification of the sub-pel region within the pel. A look-up table is formed from the generated output values that enhances print quality.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a table for enhancing the print quality of input raster pel data, comprising:
   generating an output value for different patterns of pel data, wherein each output value indicates a sub-pulse width power to charge a sub-pel region within a pel and position information indicating a justification of the sub-pel region within the pel; and
   forming a look-up table from the generated output values that enhances print quality.

2. The method of claim 1, wherein toner is attracted to the charged sub-pel region.

3. The method of claim 1, wherein one output value is generated for a subject pel depending upon the pattern of pels surrounding the subject pel, wherein there is one output value for each possible pattern of surrounding pels.

4. The method of claim 3, wherein the subject pel is at the center of the surrounding pels, and wherein the surrounding pels form a diamond shape.

5. The method of claim 1, wherein the position information is used to cluster sub-pel regions next to each other in adjacent pels and justify an edge pel toward a black filled region adjacent to the edge pel.

6. The method of claim 1, wherein the output value for the sub-pulse width power is generated by adjusting a base sub-pulse width power by weights indicating an effect of a subject black pel on surrounding pels.

7. The method of claim 6, wherein, for each region, there is a black weight indicating the effect of the subject black pel on a black pel in the region and a white weight indicating the effect of the subject black pel on a white pel in the region, wherein adjusting the base sub-pulse width power for the subject black pel comprises, for each region:
   adding the black weight to the sub-pulse width power for each black pel in the region; and
   subtracting the white weight from the sub-pulse width power for each white pel in the region.

8. The method of claim 6, wherein the output value is generated for the subject black pel effecting the surrounding pels, wherein the surrounding pels comprise multiple regions of pels, wherein there is a separate weight for each region that is used to adjust the base sub-pulse width power of the subject black pel to produce the output value.

9. The method of claim 8, wherein the weights for each region are calculated by solving an equation that uses the weights for each region to adjust an input array comprising a density at each greyscale level at the base sub-pulse width power to produce a target output array comprising desired density for each greyscale level.

10. The method of claim 9, wherein the adjustment of the input array using the weights is performed by adding a first function defining a density of the pels in the regions for each greyscale level after adjusting the subject black pel with the weights, subtracting a second function defining a density of the pels in the regions for each greyscale level with no weight effect, adding a third function defining a density of the black subject pel for each greyscale level after adjusting the center pel with the weights, and subtracting a fourth function defining a density of the black subject pel with no weight effect.

11. The method of claim 10, wherein the four functions defining the effect of the black subject pel in each region are based on a greyscale level corresponding to a percentage of the subject black pel that effects the region measured at different power levels.

12. The method of claim 11, wherein the effect of the subject black pel in each region further comprises:
   using a halftone algorithm to determine, for each region, black and white density arrays indicating a percentage of black and white pels, respectively, in the region for each greyscale level; and
   for each region, multiplying the black and white density arrays and the results of the functions indicating the effect of the subject black pel on the region to determine the black and white density effects of the subject black pel on the region.

13. A system for generating a table for enhancing print quality of input raster pel data, comprising:
   means for generating an output value for different patterns of pel data, wherein each output value indicates a sub-pulse width power to charge a sub-pel region within a pel and position information indicating a justification of the sub-pel region within the pel; and
   means for forming a look-up table from the generated output values that enhances print quality.

14. The system of claim 13, wherein toner is attracted to the charged sub-pel region.

15. The system of claim 13, wherein one output value is generated for a subject pel depending upon the pattern of pels surrounding the subject pel, wherein there is one output value for each possible pattern of surrounding pels.

16. The system of claim 15, wherein the subject pel is at the center of the surrounding pels, and wherein the surrounding pels form a diamond shape.

17. The system of claim 13, wherein the position information is used to cluster sub-pel regions next to each other in adjacent pels and justify an edge pel toward a black filled region adjacent to the edge pel.

18. The system of claim 13, further comprising means for adjusting a base sub-pulse width power by weights indicating an effect of a subject black pel on surrounding pels to generate the output value for the sub-pulse width power.

19. The system of claim 18, wherein, for each region, there is a black weight indicating the effect of the subject black pel on a black pel in the region and a white weight indicating the effect of the subject black pel on a white pel in the region, wherein the means for adjusting the base sub-pulse width power for the subject black pel comprises for each region:

means for adding the black weight to the sub-pulse width power for each black pels in the region; and means for subtracting the white weight from the sub-pulse width power for each white pel in the region.

20. The system of claim 18, wherein the output value is generated for the subject black pel effecting the surrounding pels, wherein the surrounding pels comprise multiple regions of pels, wherein there is a separate weight for each region that is used to adjust the base sub-pulse width power of the subject black pel to produce the output value.

21. The system of claim 20, further comprising means for calculating the weights for each region by solving an equation that uses the weights for each region to adjust an input array comprising a density at each gray scale level at the base sub-pulse width power to produce a target output array comprising desired density for each gray scale level.

22. The system of claim 21, wherein adjustment of the input array using the weights is performed by adding a first function defining a density of the pels in the regions for each gray scale level after adjusting the subject black pel with the weights, subtracting a second function defining a density of the pels in the regions for each gray scale level with no weight effect, adding a third function defining a density of the black subject pel for each gray scale level after adjusting the center pel with the weights, and subtracting a fourth function defining a density of the black subject pel with no weight effect.

23. The system of claim 22, wherein the four functions defining the effect of the black subject pel in each region are based on a gray scale level corresponding to a percentage of the subject black pel that effects the region measured at different power levels.

24. The system of claim 23, wherein the effect of the subject black pel in each region is determined by:

means for using a halftone algorithm to determine, for each region, black and white density arrays indicating a percentage of black and white pels, respectively, in the region for each gray scale level; and means for multiplying, for each region, the black and white density arrays and the results of the functions indicating the effect of the subject black pel on the region to determine the black and white density effects of the subject black pel on the region.

25. An article of manufacture for use in generating a table for enhancing print quality of input raster pel data, the article of manufacture comprising at least one computer program capable of causing a processor to perform:

generating an output value for different patterns of pel data, wherein each output value indicates a sub-pulse width power to charge a sub-pel region within a pel and position information indicating a justification of the sub-pel region within the pel; and forming a look-up table from the generated output values that enhances print quality.

26. The article of manufacture of claim 25, wherein toner is attracted to the charged sub-pel region.

27. The article of manufacture of claim 25, wherein one output value is generated for a subject pel depending upon the pattern of pels surrounding the subject pel, wherein there is one output value for each possible pattern of surrounding pels.

28. The article of manufacture of claim 27, wherein the subject pel is at the center of the surrounding pels, and wherein the surrounding pels form a diamond shape.

29. The article of manufacture of claim 25, wherein the position information is used to cluster sub-pel regions next to each other in adjacent pels and justify an edge pel toward a black filled region adjacent to the edge pel.

30. The article of manufacture of claim 25, wherein the output value for the sub-pulse width power is generated by adjusting a base sub-pulse width power by weights indicating an effect of a subject black pel on surrounding pels.

31. The article of manufacture of claim 30, wherein, for each region, there is a black weight indicating the effect of the subject black pel on a black pel in the region and a white weight indicating the effect of the subject black pel on a white pel in the region, wherein adjusting the base sub-pulse width power for the subject black pel comprises, for each region:

adding the black weight to the sub-pulse width power for each black pel in the region; and subtracting the white weight from the sub-pulse width power for each white pel in the region.

32. The article of manufacture of claim 30, wherein the output value is generated for the subject black pel effecting the surrounding pels, wherein the surrounding pels comprise multiple regions of pels, wherein there is a separate weight for each region that is used to adjust the base sub-pulse width power of the subject black pel to produce the output value.

33. The article of manufacture of claim 32, wherein the weights for each region are calculated by solving an equation that uses the weights for each region to adjust an input array comprising a density at each gray scale level at the base sub-pulse width power to produce a target output array comprising desired density for each gray scale level.

34. The article of manufacture of claim 33, wherein the adjustment of the input array using the weights is performed by adding a first function defining a density of the pels in the regions for each gray scale level after adjusting the subject black pel with the weights, subtracting a second function defining a density of the pels in the regions for each gray scale level with no weight effect, adding a third function defining a density of the black subject pel for each gray scale level after adjusting the center pel with the weights, and subtracting a fourth function defining a density of the black subject pel with no weight effect.

35. The article of manufacture of claim 34, wherein the four functions defining the effect of the black subject pel in each region are based on a gray scale level corresponding to a percentage of the subject black pel that effects the region measured at different power levels.

36. The article of manufacture of claim 35, wherein the effect of the subject black pel in each region further comprises:

using a halftone algorithm to determine, for each region, black and white density arrays indicating a percentage of black and white pels, respectively, in the region for each gray scale level; and for each region, multiplying the black and white density arrays and the results of the functions indicating the effect of the subject black pel on the region to determine the black and white density effects of the subject black pel on the region.

37. A computer-readable transmission medium including at least one look-up table data structure used for enhancing the print quality of input raster pel data, comprising:

an output value for different patterns of pel data, wherein each output value includes:

(i) a sub-pulse width power to charge a sub-pel region within a pel, and (ii) position information indicating a justification of the sub-pel region within the pel.

38. The computer-readable transmission medium of claim 37, wherein the look-up table data structure includes one output value for a subject pel depending upon the pattern of pels surrounding the subject pel, wherein there is one output value for each possible pattern of surrounding pels.

39. The computer-readable transmission medium of claim 37, wherein the position information is used to cluster sub-pel regions next to each other in adjacent pels and justify an edge pel toward a black filled region adjacent to the edge pel.

40. The computer-readable transmission medium of claim 37, wherein the position information is used to cluster sub-pel regions next to each other in adjacent pels and justify an edge pel toward a black filled region adjacent to the edge pel.

* * * * *